United States Patent
Chow et al.

[11] Patent Number: 5,802,825
[45] Date of Patent: Sep. 8, 1998

[54] METHOD AND APPARATUS FOR CONTROLLING ROUND BALE CUTTER

[75] Inventors: Mark K. Chow, Paoli; John H. Merritt, New Holland, both of Pa.

[73] Assignee: New Holland North America, Inc., New Holland, Pa.

[21] Appl. No.: 657,128

[22] Filed: Jun. 3, 1996

[51] Int. Cl.$^6$ .............................. A01D 39/00; B30B 5/06
[52] U.S. Cl. ................................................. 56/341; 100/88
[58] Field of Search ....................... 56/341, 343; 100/88, 100/89, 87

[56] References Cited

U.S. PATENT DOCUMENTS

| | | | |
|---|---|---|---|
| 2,893,308 | 7/1959 | Bodisch | 100/86 |
| 4,497,163 | 2/1985 | Ogman | 56/341 |
| 4,549,481 | 10/1985 | Groeneveld et al. | 100/98 |
| 4,619,106 | 10/1986 | Van Der Lely | 56/341 |
| 4,674,403 | 6/1987 | Bryant et al. | 100/4 |
| 4,782,652 | 11/1988 | White | 100/88 X |
| 4,788,900 | 12/1988 | Berkers | 56/341 X |
| 4,870,812 | 10/1989 | Jennings et al. | 56/341 |
| 5,136,831 | 8/1992 | Fell et al. | 100/88 X |
| 5,205,105 | 4/1993 | Krone et al. | 53/118 |
| 5,419,108 | 5/1995 | Webb et al. | 56/341 |
| 5,447,022 | 9/1995 | Webb | 56/341 |

*Primary Examiner*—Terry Lee Melius
*Assistant Examiner*—Thomas A. Beach
*Attorney, Agent, or Firm*—Frank A. Seemar; Larry W. Miller; John W. Stader

[57] ABSTRACT

A round baler, having a pair of spaced side walls mounted on a main frame, is supported on wheels and adapted to be pulled across a field. Positioned between the side walls is a crop confining apron for defining an expandable chamber that is adapted to rotatably form a cylindrical package of crop material. A pickup picks up crop material and conveys it into the chamber through a generally transverse crop infeed opening operatively associated with the pickup. Knives on a crop cutting device, controlled by an actuator, extend at varying positions into the expandable chamber to cut crop material on the surface of the cylindrical package as it is being formed. A control system. includes a sensor for sensing the size of the cylindrical package of crop material as it is being formed, and for providing a first signal corresponding to such size. Additionally, a second signal is provided corresponding to the position of the knife elements. These signals are processed via circuitry including a microprocessor for providing a control signal to the actuator responsive to the first and second signals.

8 Claims, 6 Drawing Sheets

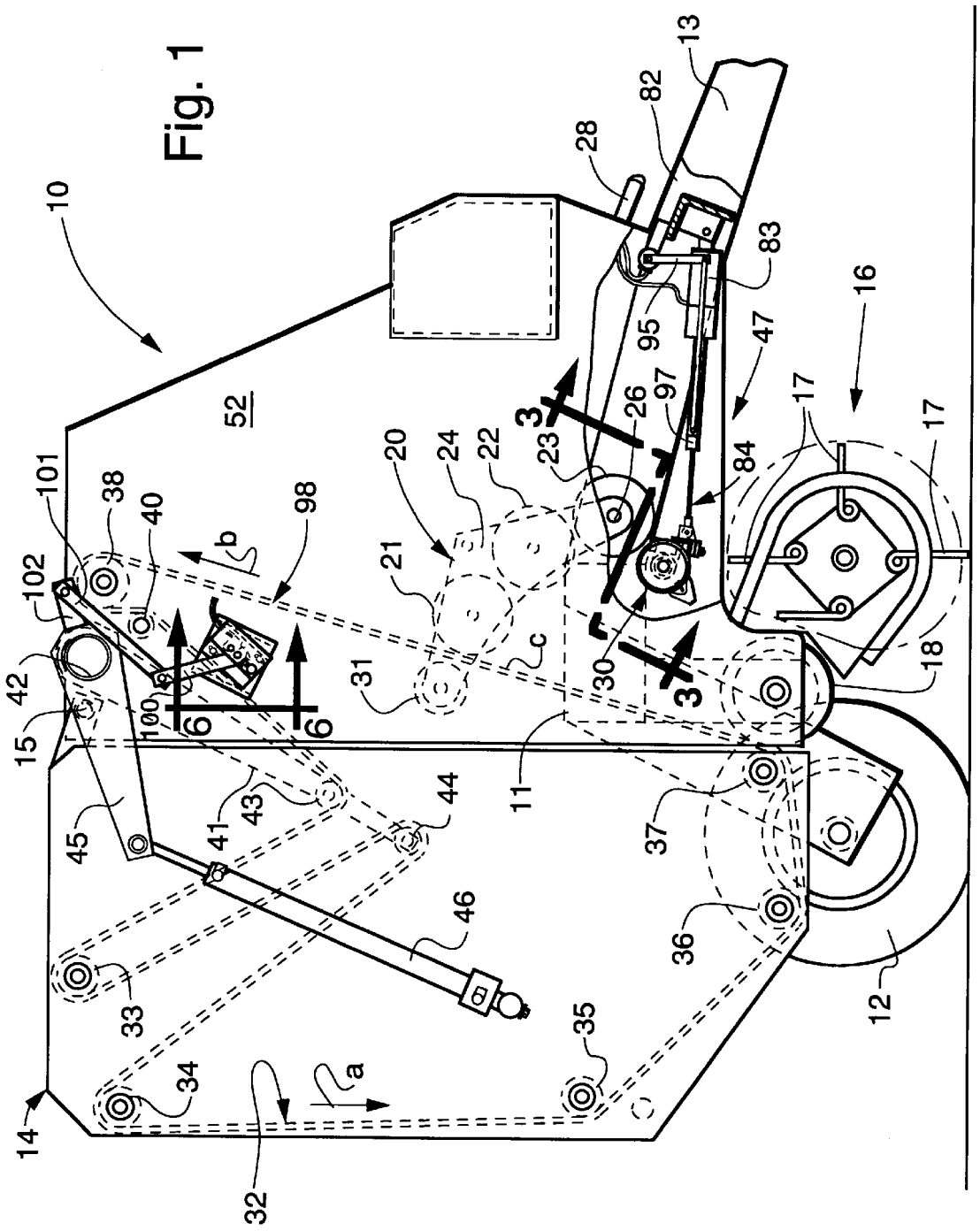

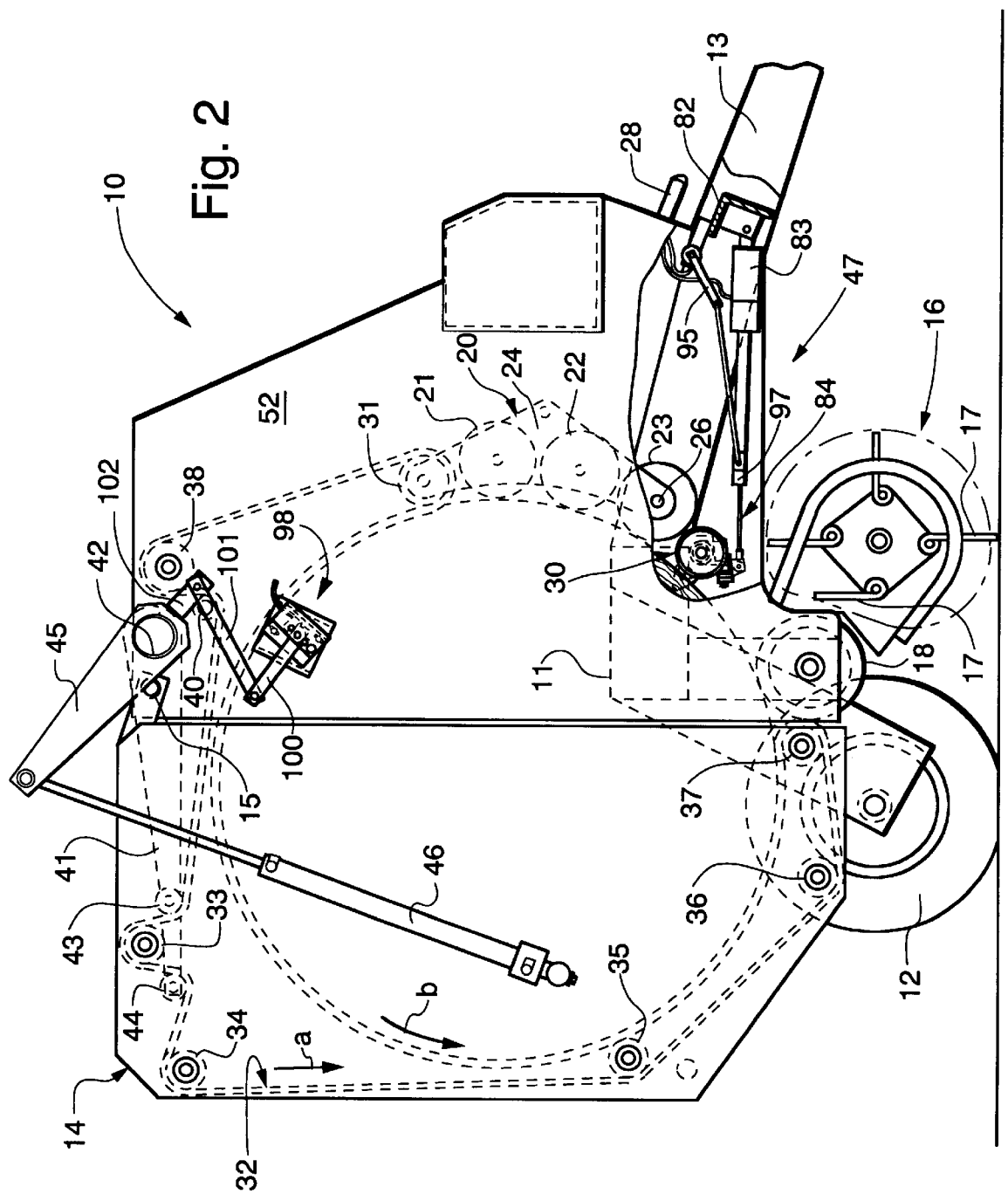

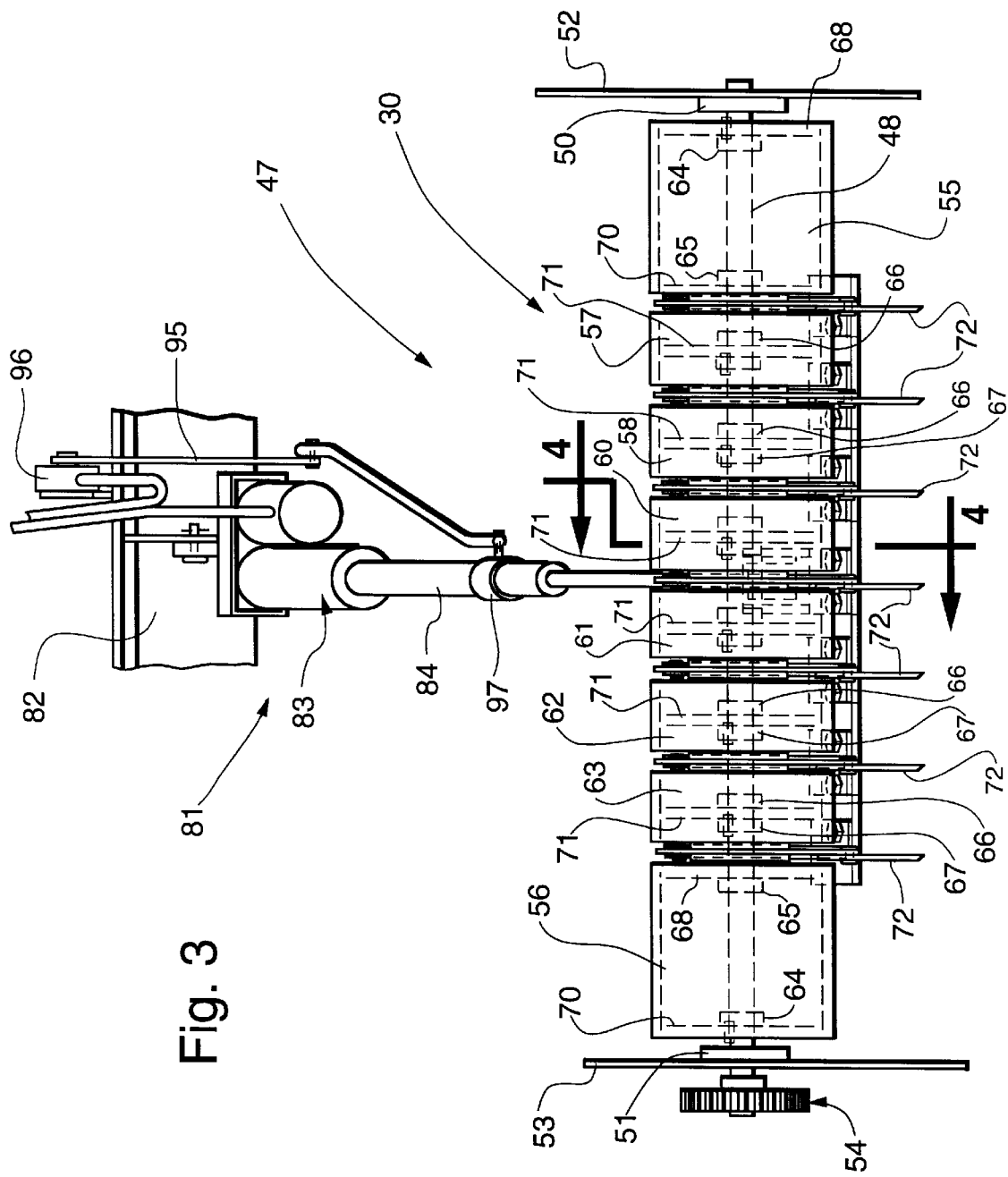

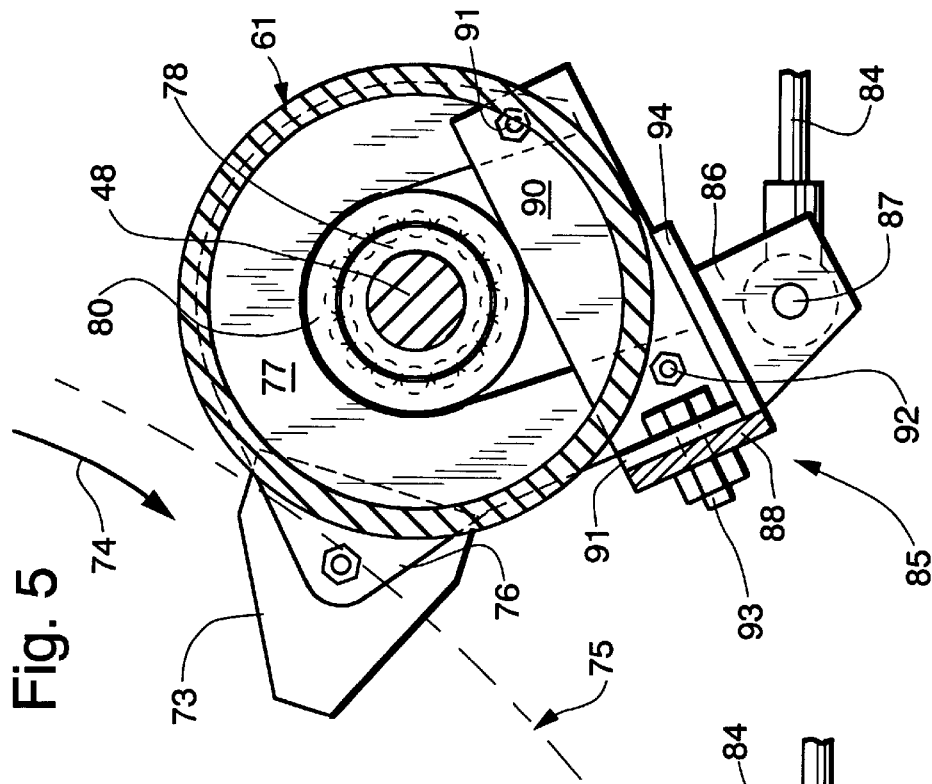
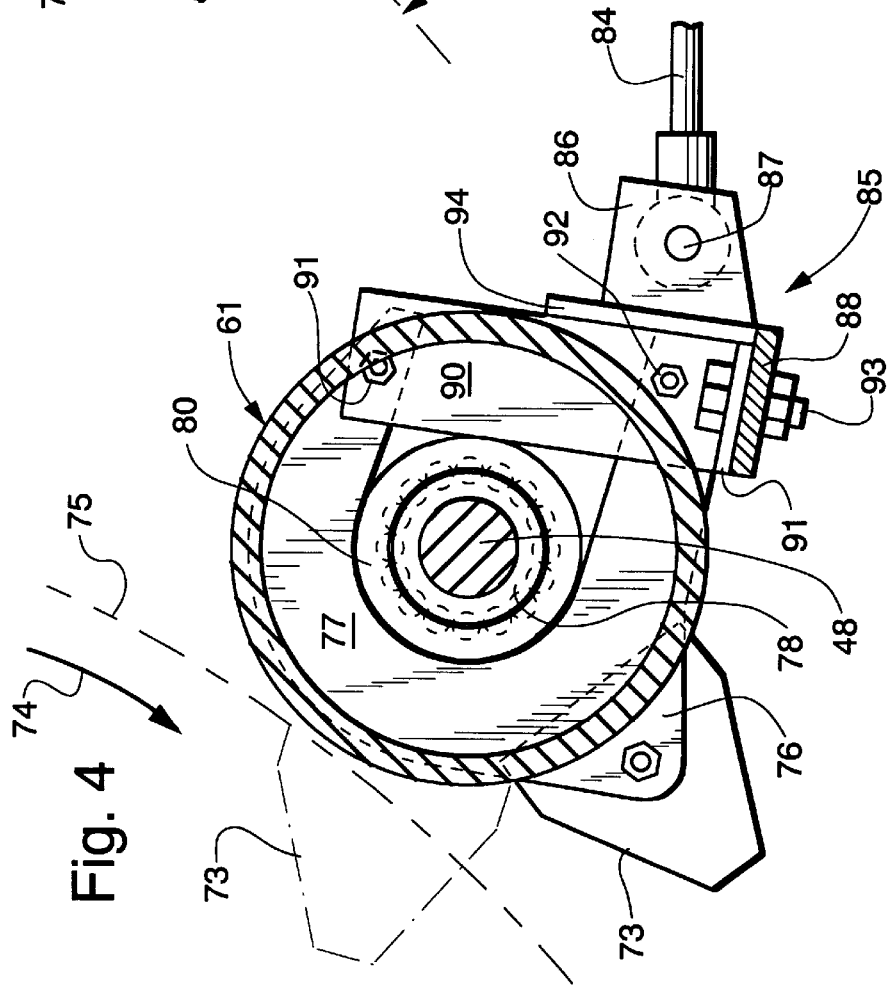

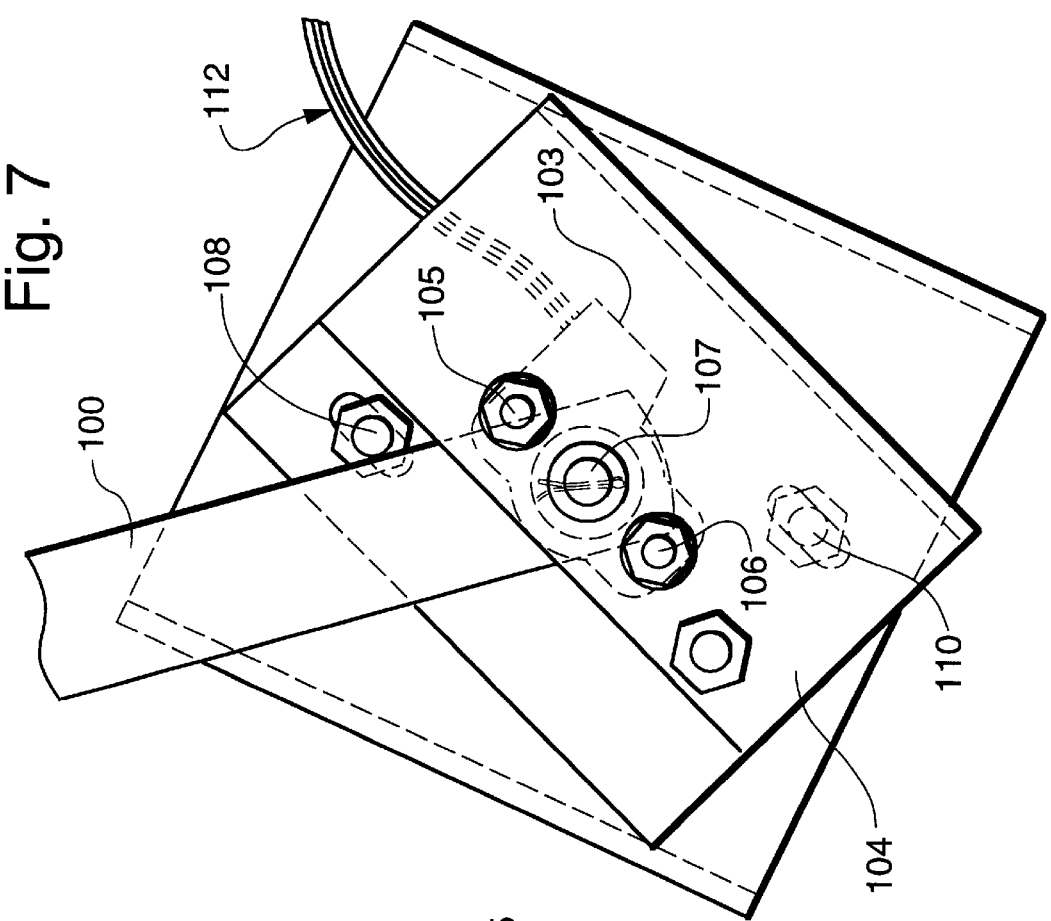
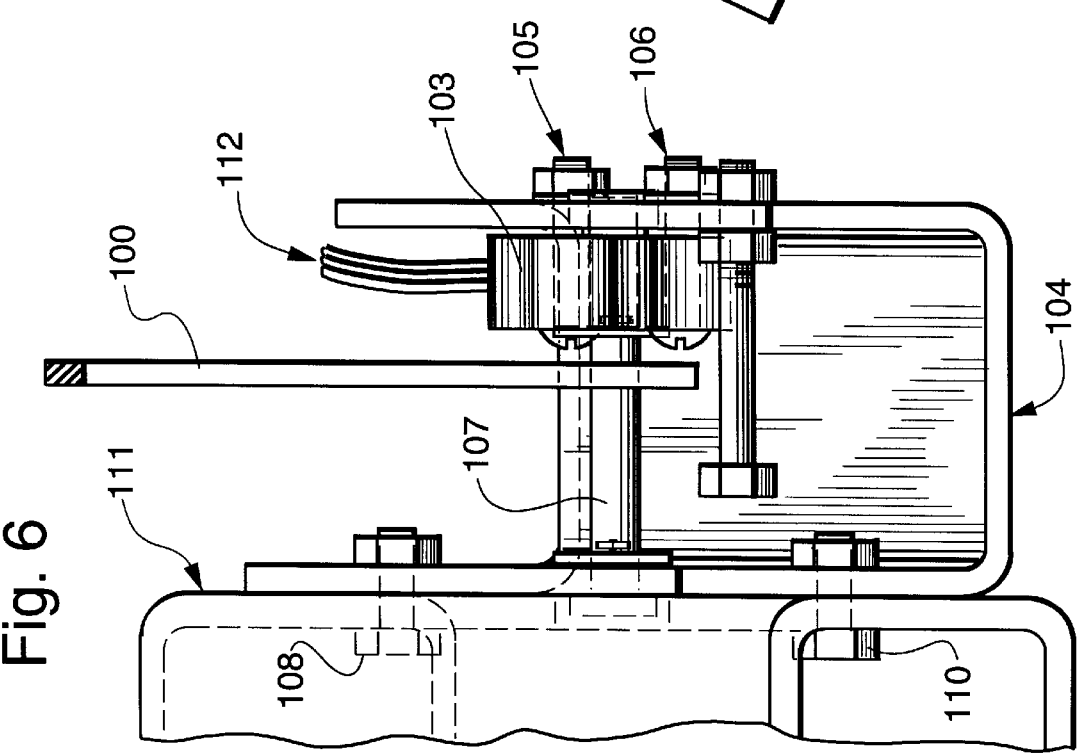

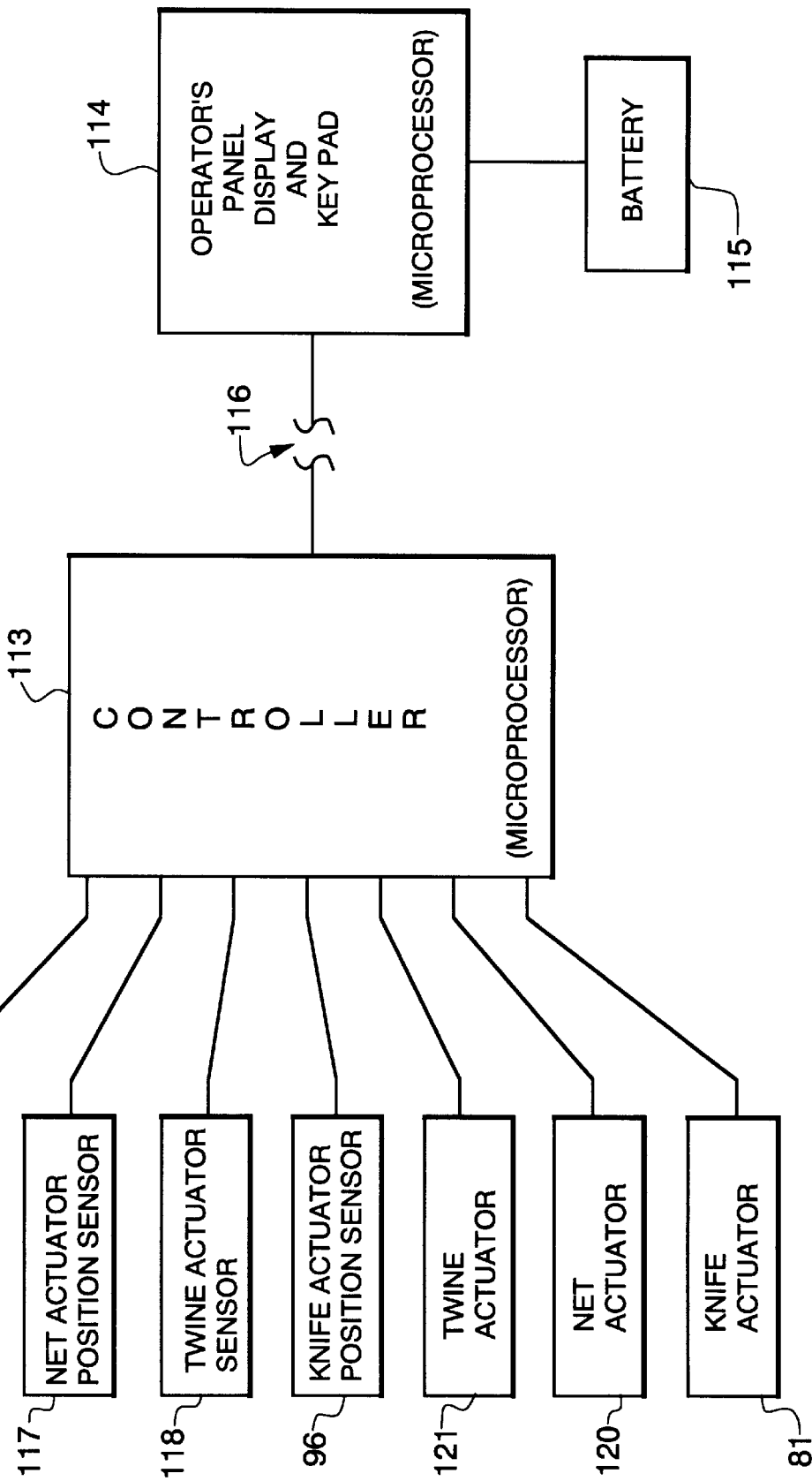

METHOD AND APPARATUS FOR CONTROLLING ROUND BALE CUTTER

FIELD OF THE INVENTION

This invention relates generally to agricultural machines for making round bales, and more particularly to a method and apparatus for controlling the round baler crop cutting mechanism disclosed in U.S. Pat. No. 5,447,022, entitled "Crop Cutting Apparatus For a Round Baler", issued Sep. 5, 1995 in the name of Bryant F. Webb, and assigned to a common assignee.

BACKGROUND OF THE INVENTION

Agricultural machines towed by a tractor across a field for picking up windrowed crop material to form a cylindrical bale are commonly referred to as round balers. These machines have either a fixed or an expandable bale forming chamber disposed between opposing vertical sidewalls. The chamber is usually defined by a floor and transverse confining means comprising a continuous flexible apron and/or a plurality of transverse rolls. Frequently the apron includes an array of side-by-side belts trained around a series of rollers that extend between the sidewalls, and the floor consists of either a large roller or a continuous conveyor belt.

During field operation, crop material such as hay is picked up from the ground and fed into the chamber. The volume of crop material increases continuously in the chamber until a compact cylindrical package is formed. The package is wrapped while still in the chamber and then ejected onto the ground as a completed bale. Well known means for wrapping round bales include twine, net and plastic sheet material.

After the round bale has been ejected from the baler, it is then either left in the field for storage until it is needed, or it is transported to a remote site. Eventually, the baled crop material, regardless of storage location, is fed out by unwrapping and unrolling it or by chopping it by means of a mechanized system.

Under certain crop conditions, such as baled silage, the crop material in the bale adheres to itself due to intertwining of crop, effect of sticky juices and moisture, etc. all of which tend to hinder the feed out process, especially in manual systems. In prior attempts to overcome this problem, the bale has been sliced into smaller segments, as disclosed in U.S. Pat. No. 4,549,481, issued Oct. 29, 1985 in the name of Wilbur E. Groenveld, et al, and U.S. Pat. No. 4,497,163, issued Feb. 5, 1985 in the name of Abraham Ogman. In the Groenveld, et al round baler apparatus, a knife is inserted into the periphery of a fully formed round bale to slice it into two cylindrically shaped parts prior to discharge from a baler. In the Ogman apparatus, which also contemplates slicing a formed bale into two parts while it is in the bale chamber, a knife is inserted through an aperture in the sidewall to make a lateral cut.

In another prior art device, disclosed in U.S. Pat. No. 5,205,105, issued Apr. 27, 1993 in the name of Bernard Krone, et al, an expandable chamber round baler is shown with cutting knives that extend from the floor roll to cut crop material conveyed into the forming chamber. In the noncutting position the knife elements in the Krone, et al baler are retracted to a position within the outer shell of the floor roll.

To further enhance feed out of crop material that has been baled the baler disclosed in previously mentioned U.S. Pat. No. 5,447,022 provides a solution to problems encountered but not solved by other prior art devices, i.e., it provides for crop cutting elements that extend into the expandable chamber to cut crop material on the surface of the cylindrical package of crop material as it is being formed. In apparatus of this type, it is desirable to have a low cost integrated control system to control and operate the crop cutting elements during varying phases of the formation of a completed package of crop material. It is particularly desirable to provide a control system of this nature that selectively slices the package of crop material as it is being formed.

SUMMARY OF THE INVENTION

An important object of the present invention is to provide a method and apparatus for automatically controlling a round baler crop cutting mechanism that enhances the capability for selectively cutting the bale being formed at predetermined radial locations without affecting the reliability and overall performance of the baler.

In pursuance of this and other important objects the present invention provides for new and useful improvements to a round baler having a main frame, a pair of spaced side walls mounted on the main frame, and crop confining means mounted between the side walls, wherein the crop confining means comprise means for defining an expandable chamber for rotatably forming a cylindrical package of crop material between the side walls. The baler further comprises pickup means mounted on the frame for picking up crop material and conveying it into the chamber, and means for defining a generally transverse crop infeed opening in the chamber, wherein the infeed opening is operatively associated with the pickup to receive crop material picked up by the pickup and conveyed into the chamber through the opening. Crop cutting means extend into the expandable chamber to cut crop material on the surface of the cylindrical package as it is being formed. The crop cutting means comprise one or more transversely spaced knife elements extendable into the chamber. An actuator incrementally retracts and extends the knife elements under conditions where crop material is being conveyed into the expandable chamber by the pickup to form a cylindrical package of hay. More particularly, the present invention contemplates a sensing means for continuously sensing the size of the cylindrical package of crop material, means for providing a first signal representing the size of the cylindrical package of crop material as it is being formed, means for providing a second signal representing the sensed position of the knife elements, and a controller including means for receiving the first and second signals and providing a control signal to the actuator means to selectively operate the knife elements responsive to the operative relationship of the first and second signals.

The invention also contemplates a method for controlling cutting apparatus in a round baler having a main frame, a pair of spaced side walls mounted on the main frame, crop confining means mounted between the side walls, the crop confining means comprising means for defining an expandable chamber for rotatably forming a cylindrical package of crop material between the side walls, pickup means mounted on the frame for picking up crop material and conveying it into the chamber, means for defining a generally transverse crop infeed opening in the chamber, the infeed opening operatively associated with the pickup to receive crop material picked up by the pickup and conveyed into the chamber through the opening, crop cutting means comprising one or more transversely spaced knife elements extendable into the chamber for cutting crop material on the surface of said cylindrical package as it is being formed, actuator means for extending and retracting the knife elements under conditions where crop material is being conveyed into the expandable chamber to form a cylindrical package of hay, and means for sensing the position of the knife elements. More particularly, the method comprises the steps of continuously sensing the size of the cylindrical package of crop material, providing a first signal representing the size of the cylindrical package of crop material as it is being formed, providing a second signal representing the sensed position of the knife elements, processing the first and second signals in a controller, and providing a control signal to the actuator means for selectively operating the knife elements responsive to the first and second signals.

The foregoing and other objects, features and advantages of the invention will appear more fully hereinafter from a consideration of the detailed description which follows, in conjunction with the accompanying sheets of drawings wherein one principal embodiment of the present invention is illustrated by way of example. It is to be expressly understood, however, that the drawings are for illustrative purposes and are not to be construed as defining the limits of the invention.

DESCRIPTION OF THE DRAWINGS

FIG. 1 is a diagrammatic side elevational view of a round baler on which the present invention is incorporated.

FIG. 2 is a diagrammatic side elevational view, similar to FIG. 1, of a round baler with its forming chamber in the full bale position.

FIG. 3 is a view taken in the direction of arrows 3—3 in FIG. 1.

FIG. 4 is a view taken in the direction of arrows 4—4 in FIG. 3.

FIG. 5 is a view similar to FIG. 4 with selected elements in their operative position.

FIG. 6 is a view taken in the direction of arrows 6—6 in FIG. 1.

FIG. 7 is a plan view of the bale size monitor assembly shown in FIG. 6.

FIG. 8 is a block diagram showing the relationship of the key components of the control system of the present invention.

DESCRIPTION OF THE PREFERRED EMBODIMENT

Referring now to the drawings for a more detailed description of the preferred embodiment of the invention, FIG. 1 shows a round baler 10 of the type having an expandable chamber defined by belts and rollers. Balers of this general configuration are common in the prior art, as is exemplified by the structure disclosed in U.S. Pat. No. 4,870,812, issued Oct. 12, 1989 in the name of Richard E. Jennings, et al, hereby incorporated by reference.

Round baler 10, in which the preferred embodiment of the present invention is embodied, includes a main frame 11 supported by a pair of wheels 12 (only one shown). A tongue 13 is provided on the forward portion of main frame 11 for connection to a tractor. Pivotally connected to the sides of main frame 11 by a pair of stub shafts 15 is tailgate 14 which may be closed (as shown in FIGS. 1 and 2) during bale formation or pivoted open about stub shafts 15 to discharge a completed bale. A pickup 16, mounted on main frame 11, includes a plurality of tines 17 movable in a predetermined path to lift crop material from the ground and deliver it rearwardly toward a floor roll 18, rotatably mounted on main frame 11.

A chamber for forming bales is defined in part by a sledge assembly 20 comprising a plurality of rollers 21, 22, 23 extending transversely of the main frame 11 in the arcuate arrangement seen in FIG. 1 and 2. Rollers 21, 22, 23 are journalled at their ends in a pair of spaced arms 24, one of which is shown. These arms are pivotally mounted on main frame 11 by stub shafts 26 for providing movement of sledge assembly 20 between the bale starting position shown in FIG. 1 and the full bale position shown in FIG. 2. Rollers 21, 22, 23 are driven in a counter-clockwise direction by conventional means (for example, chains and sprockets) coupled to a drive shaft 28 which in turn is connected to the power-take-off of a tractor. A starter roll 30, located adjacent roller 23, is also driven counter-clockwise, as discussed below. A freely rotatable idler roller 31, carried by arms 24, moves in an arcuate path with sledge assembly 20.

The bale forming chamber is further defined by an apron 32 comprising a plurality of continuous side-by-side belts supported by guide rolls 33, 34, 35, 36, 37 rotatably mounted in tailgate 14. Apron 32 is also supported on a drive roll 38, mounted on main frame 11. Although apron 32 passes between roller 21 and idler roller 31, it is in engagement only with idler roller 31. Roller 21 is located in close proximity to the apron belts and serves to strip crop material from the belts, in addition to its bale forming function. Suitable coupling means (not shown) connected to drive shaft 28 provide rotation of drive roll 38 in a direction causing movement of apron 32 along the changing paths, indicated generally by arrows a and b, shown in FIGS. 1 and 2. An additional guide roll 40 in the main frame 11 ensures proper driving engagement between apron 32 and drive roll 38. A pair of take up arms 41 (only one shown) are pivotally mounted on main frame 11 by a cross shaft 42 for movement between inner and outer positions, shown in FIGS. 1 and 2, respectively. Belt tension lever arms 45 (one shown) are also mounted on shaft 42 and pivot in concert with take up arms 41, the latter of which carry additional guide rolls 43, 44 for supporting apron 32. An hydraulic cylinder 46 is mounted on tail gate 14 and normally urges lever arms 45 and take up arms 41 toward their inner positions (FIG. 1), as the bale diameter increases.

When the elements of round baler 10 are disposed as shown in FIG. 1 with tailgate 14 closed, an inner course c of apron 32 extends between guide roll 37 and idler roll 31. Rollers 21, 22, 23 are inclined rearwardly on sledge assembly 20 and thereby define with course c the bale core starting chamber. Apron inner course c forms the rear wall of the chamber while the inwardly facing peripheral surfaces of rollers 21, 22, 23 define in a general manner a rearwardly inclined cooperating front wall. Floor roll 18 defines the bottom of the chamber and starter roller 30, spaced from floor roll 18, provides the upper boundary of an inlet for crop material, in addition to further defining the chamber.

As is common practice, round baler 10 is towed across a field on which crop material has been deposited. Pickup tines 17 lift such crop material from the ground and deliver it rearwardly to floor roll 18, which conveys it into engagement with apron inner course c (FIG. 1) whereupon it is urged upwardly and slightly forwardly into engagement with rollers 21, 22, 23. In this manner crop material is coiled in a clockwise direction to start a bale core. Continued feeding of crop material into the bale forming chamber by pickup tines 17 causes apron inner course c to expand in length around a portion of the circumference of the bale core as the crop material travels along a continuously spiraling path causing the diameter to increase. Take up arms 41 rotate with lever arms 45 from their inner positions shown in FIG. 1 toward their outer positions shown in FIG. 2 to permit expansion of the inner course of the apron in a well known manner, i.e., in effect the outer course of the belts of apron 32 is diminished in length while the inner course increases a like amount. After a bale has been formed, tailgate 14 is opened and the bale is ejected rearwardly. Subsequent closing of tailgate 14 returns the inner and outer courses of the belts to the locations shown in FIG. 1.

During bale formation, sledge assembly 20 also moves between a bale starting position (FIG. 1) to a full bale position (FIG. 2). This movement of sledge assembly 20 causes idler roller 31 to move in an arcuate path while maintaining apron 32 in close proximity to roller 21. Sledge assembly 20 is pushed outwardly towards its full bale position during bale formation as crop material expands against rollers 21, 22, 23 and then subsequently is pulled inwardly by apron 32 to the position shown in FIG. 1 during bale ejection A bale size monitor assembly, generally designated by reference numeral 98 in FIGS. 1 and 2, provides an output signal directly proportional to the diameter of the package of crop material in the chamber. Arm 100, which pivots about a fixed point at one end to control a potentiometer (discussed in detail below), is pivotally attached at its other end to intermediate lever 101, which in turn is pivotally attached to tab 102, affixed to lever arm 45. Thus, when lever arm 45 pivots about shaft 42 as the cylindrical package of crop material is expanding in the chamber, arm 100 pivots about its fixed pivot to vary the output of the potentiometer mentioned above.

Now turning to the crop cutting apparatus, generally designated by reference numeral 47 in FIGS. 1, 2 and 3, starter roll 30 (see FIG. 3) is mounted on a shaft 48, journalled for rotation in bearing assemblies 50, 51 mounted on side walls 52, 53. Gear 54 is driven in a conventional manner (with rollers 21, 22, and 23) by a chain and sprocket arrangement coupled to drive shaft 28.

Starter roll 30 comprises two similar outer cylindrical segments 55, 56 and six similar inner cylindrical segments 57, 58, 60, 61, 62, 63, all of which are affixed to shaft 48 by a pair of keyed collar elements 64, 65, and 66, 67, for outer and inner segments, respectively. The outer segments 55, 56 of starter roll 30 include end walls 68, 70 to which collars 64 are affixed. Each of the inner segments include an inner wall 71 to which a pair of collars 66, 67 are affixed.

A plurality of knives 72, extending outwardly from roll 30, are mounted in the annular space between adjacent segments. Each knife 72 is generally triangularly shaped (see FIGS. 4 and 5) and includes at least one edge 73 sharpened for cutting the crop material passing in the direction designated by arrow 74. The outer periphery of the cylindrical package of crop material being rotated in the bale forming chamber is generally designated by reference numeral 75. Each knife 72 is mounted via a tab 76 to a C shaped bracket 77 which encompasses shaft 48. A bearing assembly, comprising an inner race 78 encircling shaft 48 and an outer race 80 affixed to C shaped bracket 77, enables knife 72 to be rotated about shaft 48 between the positions shown in FIGS. 4 and 5.

An actuator 81 (FIG. 3) mounted on a cross member 82 of frame 11 consists of a main body portion 83 and reciprocally driven element 84, which is pivotally attached to knife mounting assembly 85 via flange 86 and pin 87. Knife mounting assembly 85 includes a transverse base member 88 from which a plurality of upright struts 90 extend for securing C shaped brackets 77 in place (via bolts 91, 92) on and for rotation about shaft 48. Upright struts 90 include flange portions 91 which are secured to base member 88 via bolts 93. Completing mounting assembly 85 is rectangular plate 94 integral with flange 86 and extending upwardly from and also integral with transverse base member 88. It should be noted that the entire mounting assembly could be conveniently fabricated as a unitary weld assembly to yield the same result.

The position of driven actuator element 84 determines the angular position of pivoting leg 95 relative to electrical sensing means 96. Thus, as the position of bracket 97 moves with element 84 relative to main body portion 83, leg 95 rotates about the axis of electrical position sensing means 96, whereby the angular position of leg 95 is accurately ascertainable. A conventional potentiometer is employed, i.e., a commercially available product manufactured by CTS Corporation, Elkhart, Ind., designated by Part No. 06543. The retracted and fully extended knife positions correspond to the two positions of leg 95 shown in FIGS. 1 and 2.

Turning again to bale size monitor assembly 98, FIGS. 6 and 7 depict a prior art arrangement wherein potentiometer 103 is affixed to bracket 104 by bolts 105, 106 in a manner whereby the rotating arm of the potentiometer is adjustable via shaft 107 journalled in bracket 104. The assembly is mounted via bolts 108, 110 to a shoulder 111 extending from mainframe 11 a distance suitable for permitting rotation of shaft 107, by arm 100 to which it is secured. The input and variable output voltage of potentiometer 103 is provided by three wires 112 in a conventional manner.

During field operation, baler 10 is pulled along and picks up a windrow of crop material in a conventional manner as mentioned above. As the mat of material is guided in a spiral fashion to form the cylindrical package of crop material, the crop forming elements expand to accommodate the constantly increasing diameter of the cylindrical package of crop that will eventually be wrapped and discharged onto the field as a completed round bale. Prior to baling the knives of crop cutting mechanism 47 are initially in the position shown in FIG. 4. Depending on the size of the cylindrical package of crop material during formation, the type of wrapping medium, and the type and condition of crop being baled, knives 72 are incrementally rotated to any position between the positions shown in FIGS. 4 and 5 during the time the bale is being formed, i.e., fully retracted, partly extended or fully extended. When the knives are extended into the chamber to the position shown in FIG. 5, or any intermediate position, the material on the outside of the spiralling mat is engaged and cut after it has completed its travel along the periphery of the expanding chamber and prior to being spiraled into the interior of the package as it is being formed. The crop is severed in approximately the same transverse location to facilitate bale feed out, i.e., as long as the knives are in operative position a radial slice is being defined in the crop material for each knife.

In the event the conditions are such that the operator desires to reduce the severing action he has several options, one of which was mentioned above relative to the incremental positioning of the knives. He can also reduce the numbers of knives by removing knives and forming a new pattern, e.g., remove alternate knives, or he has the option of retracting the knives during a selected portion of the bale forming cycle during operation. This invention facilitates the automatic selection of the position of the knifes relative to the size and other factors involved in the formation of the cylindrical package of crop material into a desired round bale package. Included in the other factors that must be considered to maximize the efficient and effective formation of round bales is the crop condition, e.g., whether the crop being baled has a relatively high moisture content. Still another factor of considerable importance when a bale is being sliced by knifes is the type of wrapping medium, i.e., when twine is being used the outer portion of the package should be formed without indentations from the cutters, whereas when net is being used this criteria is less important.

Now turning to FIG. 8, a diagram is shown of a control system which effectively coordinates the bale slicing function with the size of the bale and the other factors mentioned above. A controller 113 receives signals from various sensors, processes these signals along with other data received from the operator's panel 114, to selectively control various actuators in accordance with commands from the keypad on the operator panel. Commands are generated at the key pad in response to desired results and/or dynamic operating functions being continuously monitored and displayed on the operator panel. The operator panel is typically mounted in a tractor cab and provided with voltage from the tractor 12 volt battery 115 via conventional circuit breaker and relay circuits. The operator panel 114, conveniently mounted on the tractor, is coupled to the controller 113, which is on the baler, by means of a serial communications link 116 with multi-pin connectors.

The three wires 112 from potentiometer 103, embodied in bale size monitor assembly 98 (also referred to as a bale size sensor), provide controller 113 with a variable output signal that represents the size or diameter of the cylindrical package of crop material in the chamber. Similarly, net actuator position sensor 117 provides controller 113 with a variable output signal that corresponds to the position of the net actuator. For example, see the net actuator system disclosed in copending U.S. Pat. application Ser. No. 8/651,026, filed May 21, 1996, now U.S. Pat. No. 5,687,548, and assigned to a common assignee. Twine actuator sensor 118 provides a signal indicative of the operative condition of a twine dispensing mechanism in any conventional manner, e.g., the dispensing condition of a twine arm is monitored before, during and after a twine wrapping operation. Knife actuator position sensor 96 is described above.

Insofar as control of the various actuators is concerned, knife actuator 81, described above, is energized via the controller, based on signals originating at the operator panel key pad or from signals previously stored in memory. In a like manner net actuator 120 is selectively energized via signals that extend and retract a net dispensing mechanism of the type disclosed in U.S. Pat. application Ser. No. 8/651,026, now U.S. Pat. No. 5,687,548,mentioned in the preceding paragraph. Lastly, twine actuator 121 is provided with signals for selectively controlling the position of a twine dispensing mechanism.

By use of standard computer technology, the system depicted in block diagram form in FIG. 8 provides a unique control method in a round baler for controlling a crop cutter mechanism automatically when used in conjunction with net or twine wrapping apparatus, yielding significant advantages and features heretofore not known. A programmable bale size used in conjunction with a round baler cutter knife controls the cut position of the knives and thereby prevents bale core starting problems. The operator selects the bale size most suitable for the crop and windrow conditions and control of the knives is programmed accordingly.

An important feature of the present invention is the fact that the cutter knives are programmable to any depth in the surface of the cylindrical crop package. Thus, because the position of the knives in their travel range is capable of being continuously monitored, that position can readily be programmed for change based on bale size, and drop conditions. The entire bale can be sliced or only intermittent cutting can be utilized during formation of the bale.

Another important feature is the capability to automatically move the cutter knives out of the crop material prior to reaching the full bale size. This sequence is required to permit a layer of uncut crop material to form on the outer surface and thereby avoid indentations in which the twine could become ensnared. This is also important when completed bales are being transported, in which instance it may be desirable to increase the thickness programmed for the outer layer.

Of the many implicit and explicit advantages of the present invention is the ability to automatically or manually control the slicing operation of a round bale. The system is readily integrated with either a net wrapping or a twine wrapping system, both of which have requirements for widely divergent operating parameters, which also may vary based on crop conditions and crop types.

While preferred structure in which the principles of the present invention have been incorporated is shown and described above, it is to be understood that the invention is not limited to such structure, but that, in fact, widely different means of varying scope and configuration may be employed in the practice of the invention.

Having thus described the invention, what is claimed is:

1. In a round baler having a main frame, a pair of spaced side walls mounted on said main frame, crop confining means mounted between said side walls, said crop confining means comprising means for defining an expandable chamber for rotatably forming a cylindrical package of crop material between said side walls, pickup means mounted on said frame for picking up crop material and conveying it into said chamber, means for defining a generally transverse crop infeed opening in said chamber, said infeed opening operatively associated with said pickup to receive crop material picked up by said pickup and conveyed into said chamber through said opening, crop cutting means comprising one or more transversely spaced knife elements extendable into said chamber for cutting crop material on the surface of said cylindrical package as it is being formed, actuator means for operating said knife elements under conditions where crop material is being conveyed into said expandable chamber to form a cylindrical package of hay, and means for sensing the position of said knife elements, the improvement comprising:

apparatus for controlling said crop cutting means including sensing means for continuously sensing the size of said cylindrical package of crop material, means for providing a first signal representing the size of said cylindrical package of crop material as it is being formed, means for providing a second signal representing the sensed position of said knife elements, and a controller including means for receiving said first and second signals and providing a control signal to said actuator means to selectively operate said knife elements responsive to the operative relationship of said first and second signals.

2. In a round baler as set forth in claim 1 wherein said crop confining means include means for conveying said crop material in a continuously spiralling path as said chamber expands to form a cylindrical package of crop material having a continuously increasing diameter, and said controller provides said control signal to said actuator to extend said knife elements to cut said crop subsequent to its being incorporated into said expanding package.

3. In a round baler as set forth in claim 2 wherein said means for defining further comprise a floor conveyor extending between said side walls to receive crop material conveyed into said chamber by said pickup, said floor conveyor defining the lower limit of said infeed opening, and means for driving said floor conveyor to initially urge said crop material along its spiral path.

4. In a round baler as set forth in claim 3 wherein said knife elements engage the periphery of said cylindrical package as said crop material is being spirally urged into engagement with crop material that is being introduced to said chamber subsequent to said crop being cut by said cutting means.

5. In a round baler as set forth in claim 4 wherein said means for sensing said first signal comprises electrical means for providing a linearly variable output signal directly proportional to said bale size.

6. In a round baler as set forth in claim 5 wherein said electrical means comprises a potentiometer.

7. A method for controlling cutting apparatus in a round baler having a main frame, a pair of spaced side walls mounted on said main frame, crop confining means mounted between said side walls, said crop confining means comprising means for defining an expandable chamber for rotatably forming a cylindrical package of crop material between said side walls, pickup means mounted on said frame for picking up crop material and conveying it into said chamber, means for defining a generally transverse crop infeed opening in said chamber, said infeed opening operatively associated with said pickup to receive crop material picked up by said pickup and conveyed into said chamber through said opening, crop cutting means comprising one or more transversely spaced knife elements extendable into said chamber for cutting crop material on the surface of said cylindrical package as it is being formed, actuator means for extending and retracting said knife elements under conditions where crop material is being conveyed into said expandable chamber to form a cylindrical package of hay, and means for sensing the position of said knife elements, comprising the steps of continuously sensing the size of said cylindrical package of crop material, providing a first signal representing the size of said cylindrical package of crop material as it is being formed, providing a second signal representing the sensed position of said knife elements, processing said first and second signals in a controller, and providing a control signal to said actuator means for selectively operating said knife elements responsive to said first and second signals.

8. In apparatus as set forth in claim 7 wherein said crop confining means include means for conveying said crop material in a continuously spiralling path as said chamber expands to form a cylindrical package of crop material having a continuously increasing diameter, and said controller provides said control signal to said actuator to extend said knife elements to cut said crop subsequent to its being incorporated into said expanding package, and wherein said method further comprises retracting and extending said knife elements into the outer periphery of said continuously expanding cylindrical package under conditions where said actuator means are operative.

\* \* \* \* \*